(12) United States Patent
Lee et al.

(10) Patent No.: US 12,002,218 B2
(45) Date of Patent: Jun. 4, 2024

(54) METHOD AND APPARATUS WITH OBJECT TRACKING

(71) Applicant: Samsung Electronics Co., Ltd., Suwon-si (KR)

(72) Inventors: Hyunjeong Lee, Seoul (KR); Seungwook Kim, Seoul (KR); Changbeom Park, Seoul (KR); Byung In Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 17/531,972

(22) Filed: Nov. 22, 2021

(65) Prior Publication Data
US 2022/0164961 A1 May 26, 2022

(30) Foreign Application Priority Data

Nov. 26, 2020 (KR) ........................ 10-2020-0161511

(51) Int. Cl.
*G06T 7/00* (2017.01)
*G06F 18/22* (2023.01)
*G06T 7/136* (2017.01)
*G06T 7/194* (2017.01)
*G06T 7/246* (2017.01)
*G06V 10/75* (2022.01)

(52) U.S. Cl.
CPC .............. *G06T 7/194* (2017.01); *G06F 18/22* (2023.01); *G06T 7/136* (2017.01); *G06T 7/248* (2017.01);
(Continued)

(58) Field of Classification Search
CPC ......... G06T 7/194; G06T 7/136; G06T 7/248; G06T 2207/10024; G06T 2207/20081;
(Continued)

(56) References Cited

U.S. PATENT DOCUMENTS 8,326,029 B1 * 12/2012 Obrador .............. G06F 16/5838
382/164
10,275,709 B2 4/2019 Munteanu et al.
(Continued)

FOREIGN PATENT DOCUMENTS

KR 10-2011-0074107 A 6/2011
KR 10-1442042 B1 9/2014
(Continued)

OTHER PUBLICATIONS

Bertinetto, et al. "Staple: Complementary learners for real-time tracking." *Proceedings of the IEEE conference on computer vision and pattern recognition.* Apr. 13, 2016. (9 pages in English).

*Primary Examiner* — Van D Huynh
(74) *Attorney, Agent, or Firm* — NSIP Law

(57) ABSTRACT

A method, apparatus, and system with tracking are disclosed. The apparatus is configured to acquire a feature map of a template image, a color histogram of a foreground of the template image that has an object, and a color histogram of a background of the template image other than the foreground, acquire a feature score map, and a bounding box map corresponding to the feature score map, based on the feature map of the template image and a feature map of a search image, acquire a color score map based on the color histogram of the foreground, the color histogram of the background, and a color value of the search image, acquire a final score map, and a bounding box map corresponding to the final score map, based on the feature score map, the color score map, and the bounding box map, and output the corresponding bounding box.

30 Claims, 8 Drawing Sheets

(52) U.S. Cl.
CPC .. *G06V 10/751* (2022.01); *G06T 2207/10024* (2013.01)

(58) Field of Classification Search
CPC ............. G06T 7/90; G06T 2207/10016; G06T 2207/20084; G06T 7/246; G06T 3/40; G06T 5/40; G06T 2210/12; G06F 18/22; G06V 10/751; G06V 10/25; G06V 10/62; G06V 10/758; G06V 10/82; G06V 10/56; G06N 3/08
See application file for complete search history.

(56) References Cited

U.S. PATENT DOCUMENTS

| | | | | |
|---|---|---|---|---|
| 2004/0170318 | A1* | 9/2004 | Crandall | G06V 10/758 382/165 |
| 2008/0212899 | A1* | 9/2008 | Gokturk | G06Q 30/0603 382/305 |
| 2017/0018090 | A1* | 1/2017 | Crivelle | G06T 7/20 |
| 2017/0300778 | A1* | 10/2017 | Sato | G06T 7/215 |
| 2019/0066311 | A1* | 2/2019 | Träff | G06T 7/90 |
| 2021/0019892 | A1* | 1/2021 | Zhou | G06V 40/161 |
| 2022/0319020 | A1* | 10/2022 | Ding | G06N 3/0464 |
| 2022/0366570 | A1* | 11/2022 | Takahashi | G06T 7/215 |

FOREIGN PATENT DOCUMENTS

| | | |
|---|---|---|
| KR | 10-1735365 B1 | 5/2017 |
| KR | 10-2017-0073963 A | 6/2017 |
| KR | 10-2017-0082735 A | 7/2017 |
| KR | 10-2017-0097265 A | 8/2017 |
| KR | 10-1868103 B1 | 6/2018 |
| KR | 10-2019-0078543 A | 7/2019 |
| KR | 10-2019-0095200 A | 8/2019 |
| KR | 10-2120007 B1 | 6/2020 |
| WO | WO 2019/014646 A1 | 1/2019 |

* cited by examiner

METHOD AND APPARATUS WITH OBJECT TRACKING

CROSS-REFERENCE TO RELATED APPLICATIONS

This application claims the benefit under 35 USC § 119(a) of Korean Patent Application No. 10-2020-0161511, filed on Nov. 26, 2020, in the Korean Intellectual Property Office, the entire disclosure of which is incorporated herein by reference for all purposes.

BACKGROUND

1. Field

The following description relates to a method and apparatus with object tracking.

2. Description of Related Art

Object tracking technology may include a technology for detecting an object in continuous images. In general, a neural network for extracting feature information may be trained offline before inference use. The neural network trained through offline learning may lack information on characteristics of a current target. For an image that is not quite similar to learning data, accuracy of the neural network may be low in real world use.

For example, when an unlearned target similar to an object is present in a search image, if the object is tracked using only the feature information, a wrong object may be tracked. For example, even when the tracked object is not similar to objects used in the training, some feature information extracted by the neural network for the tracked object may appear similar to feature information of one of the objects used in the training, which may lead to tracking the wrong object. As another example, a correct original object may be tracked in a previous frame, but a wrong object may be then be tracked in a subsequent frame due to deformation of the original object.

The above description has been possessed or acquired by the inventor(s) in the course of conceiving the disclosure of the present application and is not necessarily an art publicly known before the present application is filed, but rather, learnt after an understanding of the disclosure of the present application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes acquiring a feature map of a template image, a color histogram of a foreground of the template image, and a color histogram of a background of the template image other than the foreground, where the foreground includes an object included in the template image, acquiring a feature score map, and a bounding box map corresponding to the feature score map, based on the feature map of the template image and a feature map of a search image of a current frame, acquiring a color score map based on the color histogram of the foreground, the color histogram of the background, and a color value of the search image of the current frame, acquiring a final score map, and a bounding box map corresponding to the final score map, based on the feature score map, the color score map, and the bounding box map, and outputting a bounding box corresponding to a pixel having a highest value of the final score map from the bounding box map.

The acquiring of the color score map may include acquiring a foreground color similarity map based on the color value of the search image and the color histogram of the foreground, acquiring a background color similarity map based on the color value of the search image and the color histogram of the background, acquiring the color score map based on the foreground color similarity map and the background color similarity map.

The acquiring of the color score map based on the foreground color similarity map and the background color similarity map may include acquiring the color score map by calculating a ratio of a pixel value of the foreground color similarity map to a sum of the pixel value of the foreground color similarity map and a pixel value of the background color similarity map, for each pixel.

The acquiring of the color score map may further include scaling the foreground color similarity map and the background color similarity map based on an area proportion of the background and an area proportion of the foreground, respectively, and the acquiring of the color score map based on the foreground color similarity map and the background color similarity map may include acquiring the color score map based on the scaled foreground color similarity map and the scaled background color similarity map.

The acquiring of the color score map based on the scaled foreground color similarity map and the scaled background color similarity map may include acquiring the color score map by calculating a ratio of a pixel value of the scaled foreground color similarity map to a sum of the pixel value of the scaled foreground color similarity map, a pixel value of the scaled background color similarity map, and an adjustment constant, for each pixel.

The method may further include acquiring a foreground color similarity map based on the color value of the search image and the color histogram of the foreground, acquiring a background color similarity map based on the color value of the search image and the color histogram of the background, and calculating a color weight representing an extent of non-similarity of the foreground color similarity map and the background color similarity map.

The calculating of the color weight may include calculating a feature weight representing a similarity between the foreground color similarity map and the background color similarity map, and calculating the color weight by subtracting the feature weight from a reference constant.

The calculating of the color weight may include calculating the color weight through an inner product between the foreground color similarity map and the background color similarity map.

The acquiring of the final score map, and the bounding box map corresponding to the final score map, may include acquiring the final score map by calculating a weight average by applying the feature weight to a pixel value of the feature score map and applying the color weight to a pixel value of the color score map, for each pixel.

The acquiring of the final score map, and the bounding box map corresponding to the final score map, may include adjusting resolutions of the feature score map and the color score map equally to acquire the final score map and the bounding box map corresponding to the final score map.

The method may further include comparing the color weight to a second threshold, where in response to the color weight failing to meet the second threshold, the acquiring of the bounding box map may include using the feature score map and the bounding box map as the final score map and the bounding box map corresponding to the final score map.

The method may further include comparing a maximum value of a pixel of the feature score map to a first threshold, where in response to the maximum value of the pixel of the feature score map failing to meet the first threshold, the acquiring of the color score map and the acquiring of the bounding box map may be selected to not be performed, and the outputting of the bounding box may include outputting a bounding box of a previous frame.

The method may further include updating the color histogram of the foreground and the color histogram of the background based on the bounding box corresponding to the pixel having the highest value.

The method may further include acquiring a foreground color similarity map based on the color value of the search image and the color histogram of the foreground, acquiring a background color similarity map based on the color value of the search image and the color histogram of the background, calculating a color weight representing an extent of non-similarity of the foreground color similarity map and the background color similarity map, and comparing the color weight to a second threshold, wherein, in response to the color weight failing to meet the second threshold, the updating may be selected to not be performed.

The outputting of the bounding box may include tracking the object in the search image using the bounding box corresponding to the pixel.

The tracking of the object may include displaying the object on a display.

The acquiring of the feature map of the template image may include applying the template image to a neural network feature extractor to obtain the feature map of the template image, and the feature map of the search image may be generated by applying the search image to the neural network feature extractor to obtain the feature map of the search image.

In one general aspect, a non-transitory computer-readable storage medium may be provided, storing instructions that, when executed by a processor, configure the processor to perform one or more, any combination, or all operations and/or methods described herein.

In one general aspect, a processor-implemented method includes generating a feature map of a search image, generating a feature score map based on the generated feature map of the search image, and an obtained feature map for a template that includes a target object, generating a color score map dependent on a distribution of color information in a first portion of the template, a distribution of color information in a second portion of the template distinguished from the first portion, and color information of the search image, where the first portion includes the target object, tracking the target object in the search image using a bounding box determined based on the generated feature score map and the generated color score map.

The obtained feature map for the template may be read from a memory, where the feature map for the template may have been generated and stored to the memory with respect to a previous tracking of the target object for a previous search image.

The second portion of the template may be distinguished from the first portion of the template based on a bounding box determined for a previous tracking of the target object for a previous search image.

The distribution of the color information in the first portion of the template may be a scaled first histogram of the first portion of the template, and the distribution of the color information in the second portion of the template may be a scaled second histogram of the second portion of the template, where the generating the color score map may include obtaining the scaled first histogram and the scaled second histogram from a memory, where the scaled first histogram and the scaled second histogram may have been generated and stored to the memory with respect to the previous tracking of the target object for the previous search image.

The generating of the color score map may include acquiring a first color similarity map dependent on the search image and a color histogram of a foreground of the template, as the distribution of the color information in the first portion of the template, acquiring a second color similarity map dependent on the search image and a color histogram of a background of the template, as the distribution of the color information in the second portion of the template, and acquiring the color score map based on the first color similarity map and the second color similarity map.

The acquiring of the color score map based on the first color similarity map and the second color similarity map may include acquiring the color score map by calculating a ratio of a pixel value of a foreground color similarity map, as the first color similarity map, to a sum of the pixel value of the foreground color similarity map and a pixel value of a background color similarity map, as the second color similarity map.

The acquiring of the color score map based on the foreground color similarity map and the background color similarity map may include scaling the foreground color similarity map and the background color similarity map respectively, based on an area proportion of the background of the template and an area proportion of the foreground of the template, and acquiring the color score map based on the scaled foreground color similarity map and the scaled background color similarity map.

In one general aspect, an apparatus includes one or more processors configured to generate a first feature map of a first search image, generate a first feature score map dependent on the first feature map of the first search image and an obtained first feature map for a template that includes a target object, generate a first color score map dependent on color information of the first search image, color information in a first portion of the template, and color information in a second portion of the template distinguished from the first portion, where the first portion includes the target object, update the template by updating extents of the first portion and the second portion of the template based on a bounding box determined for the target object in the first search image, where the bounding box is determined dependent on the first feature score map and the first color score map, and track the target object in a second search image, subsequent to the first search image, dependent on the updated template.

The tracking of the target object in the second search image may include tracking the target object in the second search image dependent on feature information of the second search image, feature information of the updated template, color information of the second search image, and color information of the updated template.

In the updating of the template, the one or more processors may be further configured to generate a color histogram of a foreground of the updated template and a color histogram of a background based on the bounding box, where the foreground may be defined by the updated extents of the first portion, and the background may be defined by the updated extents of the second portion, and where the tracking of the target in the second search image may be dependent on the generated color histogram of the foreground, the generated color histogram of the background, and feature and color information of the second search image.

In one general aspect, an apparatus includes one or more processors configured to acquire a feature map of a template image, a color histogram of a foreground of the template image, and a color histogram of a background of the template image other than the foreground, where the foreground includes an object included in the template image, acquire a feature score map, and a bounding box map corresponding to the feature score map, based on the feature map of the template image and a feature map of a search image of a current frame, acquire a color score map based on the color histogram of the foreground, the color histogram of the background, and a color value of the search image of the current frame, acquire a final score map, and a bounding box map corresponding to the final score map, based on the feature score map, the color score map, and the bounding box map, and output a bounding box corresponding to a pixel having a highest value of the final score map from the bounding box map.

In one general aspect, a terminal includes a memory, a display, and one or more processors configured to acquire a feature map of a template image, a color histogram of a foreground of the template image, and a color histogram of a background of the template image other than the foreground, where the foreground includes an object included in the template image, acquire a feature score map, and a bounding box map corresponding to the feature score map, based on the feature map of the template image and a feature map of a search image of a current frame, acquire a color score map based on the color histogram of the foreground, the color histogram of the background, and a color value of the search image of the current frame, acquire a final score map, and a bounding box map corresponding to the final score map, based on the feature score map, the color score map, and the bounding box map, and output, through the display, a bounding box corresponding to a pixel having a highest value of the final score map from the bounding box map.

Other features and aspects will be apparent from the following detailed description, the drawings, and the claims.

Figure 1:
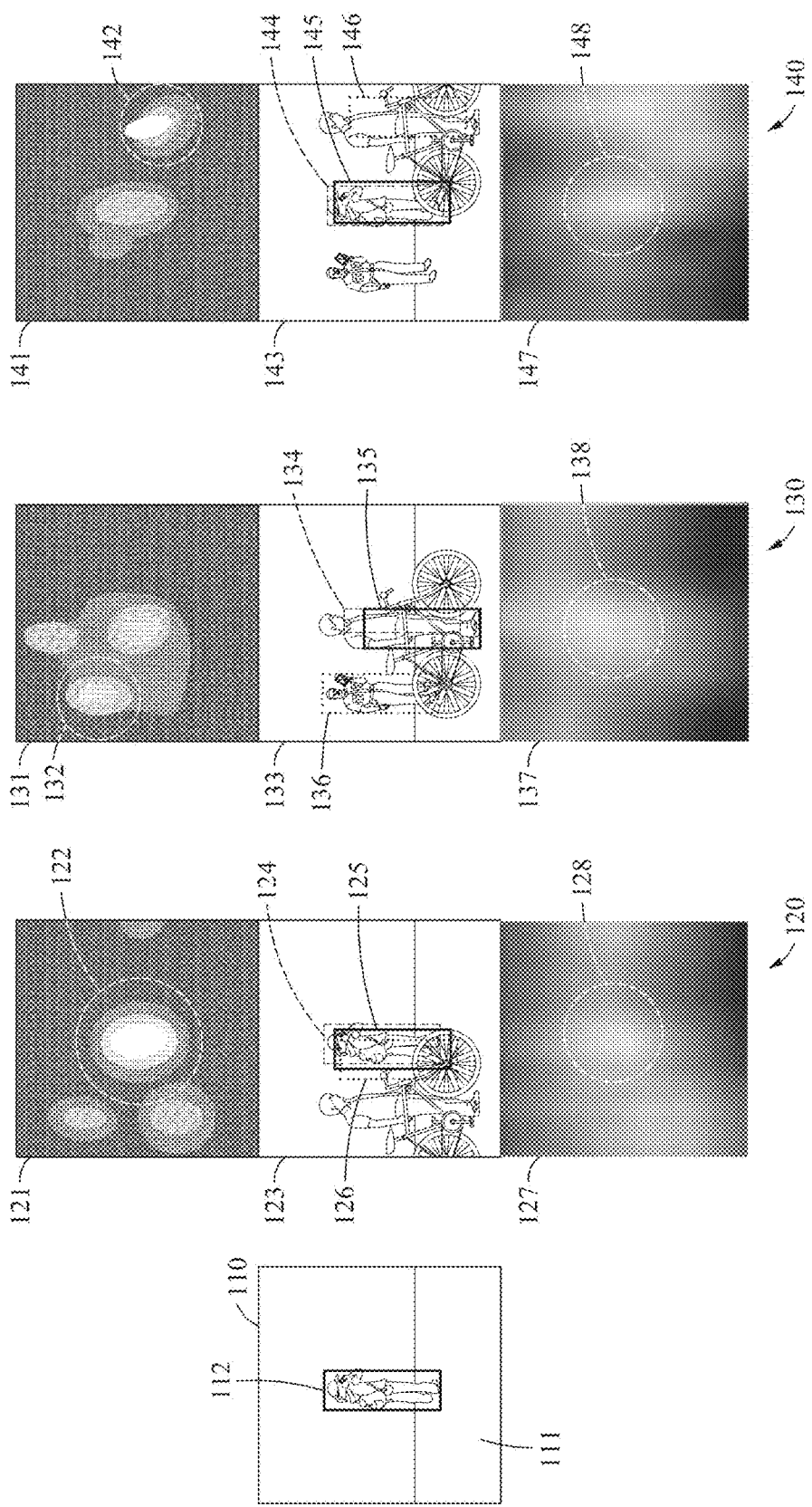
FIG. 1 illustrates an example tracking of an object in a search image by an object tracking apparatus.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims. For example, examples described herein have been provided merely to illustrate some of the many possible ways of implementing the methods, apparatuses, and/or systems described herein that will be apparent after an understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, operations, elements, components or a combination thereof, but do not preclude the presence or addition of one or more other features, integers, operations, elements, components, and/or groups thereof. The use of the term "may" herein with respect to an example or embodiment (e.g., as to what an example or embodiment may include or implement) means that at least one example or embodiment exists where such a feature is included or implemented, while all examples are not limited thereto.

Unless otherwise defined herein, all terms including technical or scientific terms used herein have the same meaning as commonly understood by one of ordinary skill in the art to which examples belong based on an understanding of the disclosure of this application. It will be further understood that terms, such as those defined in commonly-used dictionaries, should be interpreted as having a meaning that is consistent with their meaning in the context of the relevant art and the disclosure of this application and will not be interpreted in an idealized or overly formal sense unless expressly so defined herein.

FIG. 1 illustrates an example tracking of an object in a search image, e.g., of continuous frames, by an object tracking apparatus.

An object tracking apparatus may generate a feature score map using a trained neural network. The object tracking apparatus may generate a color score map from a template image and a search image. The object tracking apparatus may generate a final score map by combining the feature score map and the color score map. The object tracking apparatus may estimate a position corresponding to a highest probability in the final score map to be a position of an object. The template image refers to a representative image of an object that is a target to be tracked. The search image refers to an image in which the object is to be detected.

The object tracking apparatus may be, or be implemented in, a smartphone including a camera, a smart sensor, or a surveillance camera, for example. The object tracking apparatus may also be, or be implemented in, a computing device that receives continuous images from an external source. For example, the object tracking apparatus may be, or be implemented in, an object tracking system using a smart sensor, an autofocus system of a camera, in an example video-based surveillance system. However, these are merely examples, and the object tracking apparatus may be implemented in any field of detecting a target from an arbitrary image.

In a case of online learning, e.g., conducted online or based on recent information, a tracking accuracy may be increased, but the learning process may be repeated for each of all information of an input image, which may require substantial resources if the learning for each of all information of the input image is desired to be useful in real time. Thus, the online learning may not be suitable for a mobile terminal, which may have limited system resources.

In addition, the available neural network that can be trained through such online learning is typically restricted in operation due to hardware limitations of such a mobile terminal. For example, when parameters of a neural network are updated through back propagations, real-time learning may be difficult due to limitations in computational speed and memory of the mobile terminal.

Returning to FIG. 1, in an example, the object tracking apparatus may use feature information and color information of a template image including an object and a search image using a pre-trained neural network. The feature information and the color information may have relative advantages in some specific situations, for example. By integrating the feature information and the color information, the object tracking apparatus may achieve a higher accuracy compared to the case of using only the feature information. The object tracking apparatus may use the color information in addition to the feature information, thereby achieving the higher accuracy even for an unlearned image.

The object tracking apparatus may fuse a deep learning-based object tracking model and a color histogram-based template update model. The feature information may be acquired (e.g., generated or obtained) based on the object tracking model. The color information may be acquired (e.g., generated or obtained) based on the template update model. The object tracking apparatus may acquire (e.g., generate or obtain) a bounding box proposal and the feature information through the object tracking model. The object tracking apparatus may determine or generate a final bounding box based on the feature information and the color information, for example.

For example, the object tracking apparatus may receive a template image as an input. The template image may be an image including an object to be tracked. The template image may include a foreground image, or foreground image information, including the object and a background image, or background image information, other than the foreground image. For explanatory purposes, the foreground image may be denoted by "FG", and the background image may be denoted by "BG".

The object tracking apparatus may generate a feature map by inputting the template image to a neural network, or implementing the template image with respect to the neural network. The neural network that derives or extracts the feature map may include a convolutional neural network (CNN), for example. The neural network may be previously trained to extract feature information.

The object tracking apparatus may acquire (e.g., generate or obtain) a color histogram from the template image. The object tracking apparatus may generate a color histogram of the foreground image and a color histogram of the background image. The color histogram of the foreground image may be expressed as $H_{FG}$, and the color histogram of the background image may be expressed as $H_{BG}$. In a case of an RGB channel, a template image is a $256^3$ format which may be converted into a $32^3$ format after a histogram binning is performed for data reduction. Through the histogram binning, 256 data of each dimension may be divided into eight portions and converted into 32 data.

The object tracking apparatus may receive a search image of continuous frames. The object tracking apparatus may generate a feature map of the search image through the neural network. The object tracking apparatus may calculate a similarity between the feature map of the search image and the feature map of the template image. The object tracking apparatus may generate a feature score map based on the feature map of the search image and the feature map of the template image. For example, the object tracking apparatus may generate a feature score map by calculating a cross correlation. Here, a feature score may also be referred to as a classness score and a CLS score.

The object tracking apparatus may acquire (e.g., generate or obtain) bounding box (e.g., Bbox) information corresponding to each pixel of the feature score map. The bounding box information corresponding to each pixel of the feature score map may also be referred to as a bounding box map. A bounding box may be a rectangular box indicating an area occupied by an estimated object. The rectangular box is merely an example, and the area occupied by the object may be indicated in various shapes.

The object tracking apparatus may determine an objectness of the feature information and determine whether to use a current frame. The object tracking apparatus may evaluate whether the object is present in the feature score map. When occlusion or target missing occurs, a feature score may decrease. When the feature score is significantly low, e.g., below a corresponding threshold, the object tracking apparatus may not use information of the current frame.

For example, the object tracking apparatus may compare a determined maximum value of a pixel of the feature score map and a first threshold. When the maximum value of the pixel of the feature score map is less than or fails to meet the first threshold, the object tracking apparatus may output a bounding box of a previous frame instead of calculating a color score map. Here the first threshold may be a criterion for determining the objectness. As such, when the objectness of the current frame is small, the object tracking apparatus may use previous frame information instead of current frame information. Through this, the object tracking apparatus may save system resources while avoiding an erroneous result. When the maximum value of the pixel of the feature score map is equal to or greater than, or meets, the first threshold, the object tracking apparatus may continue the processes to generate a bounding box of the current frame.

In furtherance of these processes, the object tracking apparatus may acquire (e.g., generate or obtain) a color similarity with a template from the search image. The object tracking apparatus may acquire (e.g., generate or obtain) a color score map based on a color value of the search image and the color histogram of the template image. The object tracking apparatus may acquire the color score map based on the color histogram of the foreground image, the color histogram of the background image, and the color value of the search image.

For example, the object tracking apparatus may acquire (e.g., generate or obtain) a foreground color similarity map of the color value of the search image and the color histogram of the foreground image. The foreground color similarity map represents a similarity probability by expressing a histogram value of the foreground image matching color for each pixel of the search image as a pixel value of the search image. The object tracking apparatus may acquire (e.g., generate or obtain) a background color similarity map of the color value of the search image and the color histogram of the background image. The background color similarity map represents a similarity probability by expressing a histogram value, for example, of the background image matching color for each pixel of the search image as the pixel value of the search image. The foreground color similarity map may be denoted by $\rho(O)$. The background color similarity map may be denoted by $\rho(B)$. For example, the foreground color similarity map and the background color similarity map may be calculated through an implementing of a method such as a correlation, a KL divergence, and a Chi-square distance, as non-limiting examples.

The object tracking apparatus may acquire the color score map based on the foreground color similarity map and the background color similarity map. The object tracking apparatus may acquire the color score map by calculating a ratio of the pixel value of the foreground color similarity map to a sum of the pixel value of the foreground color similarity map and the pixel value of the background color similarity map, for each pixel.

The object tracking apparatus may adjust a signal of the color information based on a ratio between a foreground region and a background region of the template image. When the foreground region is smaller than the background region, a signal intensity of the color information of the foreground region may be reduced. The object tracking apparatus may increase the intensity of the signal of the color information of the foreground region by scaling the color information of the foreground region. Through this, a discrimination of the color information may be enhanced, and a discrimination between a target and a distractor may be enhanced.

For this, the object tracking apparatus may scale the foreground color similarity map and the background color similarity map based on an area proportion of the background image and an area proportion of the foreground image. The object tracking apparatus may acquire the color score map based on the scaled foreground color similarity map and the scaled background color similarity map.

The area proportion of the background image may be calculated as $\alpha_t$ in the below Equation 1, for example.

$$\alpha_t = \frac{BG\_Area_t}{FG\_Area_t} \qquad \text{Equation 1}$$

The area proportion of the foreground image may be calculated as $1-\alpha_t$, the scaled foreground color similarity map may be calculated as $\alpha_t \cdot \rho(O)$, and the scaled background color similarity map may be calculated as $(1-\alpha_t) \cdot \rho(B)$.

The object tracking apparatus may acquire the color score map by calculating a ratio of a pixel value of the scaled foreground color similarity map to a sum of the pixel value of the scaled foreground color similarity map, a pixel value of the scaled background color similarity map, and an adjustment constant, for each pixel.

For example, the object tracking apparatus may calculate the color score map $\beta_t$ according to the below Equation 2, for example, where $\lambda$ denotes an adjustment constant that may adjust a band of a color score.

$$\beta_t = \frac{\alpha_t \cdot \rho(O)}{\alpha_t \cdot \rho(O) + (1-\alpha_t) \cdot \rho(B) + \lambda} \qquad \text{Equation 2}$$

For further explanatory purpose, the calculated color score map $\beta_t$ will be referred to as the color score map H, which may be selectively utilized with the feature score map F to calculate a final score map, from which a final bounding box may be determined.

For example, the object tracking apparatus may determine an effectiveness of the color information. As a difference in color distribution between the foreground image and the background image increases, discrimination by the color histogram may be enhanced. However, the object tracking apparatus may determine that the color information is ineffective when a degree to which the object is discriminated by the color information is low.

The effectiveness of the color information may be expressed by a color weight representing a non-similarity between the foreground color similarity map and the background color similarity map. The object tracking apparatus may calculate the color weight by subtracting a feature weight representing a similarity between the foreground color similarity map and the background color similarity map from a reference constant. For example, the object tracking apparatus may calculate the feature weight through an inner product between the foreground color similarity map and the background color similarity map, for example.

The feature weight may be calculated to be $\rho(0)*\rho(B)$ in the below example Equation 3, and may also be expressed as $(1-\omega)$. The color weight may be denoted by $\omega$ in Equation 3.

$$\omega = 1 - \rho(0)*\rho(B) \quad \text{Equation 3:}$$

Thus, the color weight may be a value obtained by subtracting the feature weight from a reference constant. In the example of Equation 3 the reference constant is shown as the value of 1, but examples are not limited thereto.

The object tracking apparatus may compare the color weight and a second threshold. Here, the second threshold may be a criterion for determining the effectiveness of the color information. When the color weight is less than or fails to meet the second threshold, the object tracking apparatus may use the feature score map and the bounding box map as a final score map and the bounding box map corresponding to the final score map, without consideration of the color information, thereby increasing a tracking accuracy in the situation when the color information is determined ineffective. Accordingly, the object tracking apparatus may, thus, selectively use the color information, thereby much increasing the accuracy. When the color information is determined effective, the color information may be considered in the generation of the final output bounding box.

Thus, when the object tracking apparatus finds the color information to be sufficiently effective, the object tracking apparatus may acquire a final score map from the feature score map F and the color score map H.

However, even when the color information is determined effective, the object tracking apparatus may adjust an applying ratio of the color information and the feature information for a final score using a weight corresponding to the determined effectiveness of the color information. The object tracking apparatus may adjust the applying ratio of the color information and the feature information, thereby more precisely tracking the object.

For example, the object tracking apparatus may acquire a final score map by calculating a weight average by applying the feature weight $(1-\omega)$ to a pixel value of a feature score map $S_{cls}$ and applying the color weight $\omega$ to a pixel value of the color score map $S_{color}$ for each pixel, as demonstrated below in Equation 4, for example. Thus, in this example, the object tracking apparatus may adjust resolutions of the feature score map and the color score map equally to calculate the weight average.

$$S_{final} = \omega \cdot S_{color} + (1-\omega) \cdot S_{cls} \quad \text{Equation 4:}$$

The object tracking apparatus may further update the color information of the template image based on the color information derived in an inference process. By updating the color information only, latest data may be fed back with less resources, e.g., as color information of the template may be updated with each newly determined final bounding box that is determined based on color information. Through this, the accuracy may be improved in real time even in a mobile terminal with limited system resources. Since characteristics of an object may be well reflected in a most recent input image, the object tracking apparatus may appropriately cope with various changes of the object through real-time learning.

The object tracking apparatus may update the color information of the template image using object information of the current frame. The object tracking apparatus may fuse an object tracking model and an adaptive color model. The object tracking apparatus may update the color histogram of the foreground image and the color histogram of the background image based on the bounding box output from the current frame. As such, by applying the latest object information to the color information of the template image, the tracking accuracy may be improved.

The object tracking apparatus may update the color histogram of the template image when the color information of the current frame is determined effective. When the color information is determined ineffective, the object tracking apparatus may not perform the update of the color information of the template image by the color information. Avoiding or reducing a problem of errors being accumulated in the template image may be accomplished by omitting the update by the ineffective color information. The object tracking apparatus may selectively use the color information, thereby deriving more accurate color information in a subsequent frame.

The object tracking apparatus may determine whether an occlusion is present. The object tracking apparatus may output occlusion information indicating whether the occlusion is present or a probability of the occlusion existing in the search image of the current frame. The object tracking apparatus may adjust a template update and a contribution of the color information based on the occlusion information. When the occlusion is determined severe, the object tracking apparatus may reduce the contribution of the color score of the current frame and restrict the template update. Through this, the error accumulation may be significantly alleviated.

Returning to FIG. 1, FIG. 1 illustrates the example tracking of the object by the object tracking apparatus. The object tracking apparatus may receive a template image 110 as an input. The template image 110 may include a foreground image 112 including an object and a background image 111 other than the foreground image.

The object tracking apparatus may receive search images 123, 133, and 143 of continuous (e.g., consecutively captured) frames 120, 130, and 140. Example feature score maps 121, 131, and 141 are demonstrated above the frames 120, 130, and 140, respectively, and example color score maps 127, 137, and 147 are demonstrated below the frames 120, 130, and 140, respectively.

Bounding boxes indicated in the search images 123, 133, and 143 may demonstrate ground truth bounding boxes 124, 134, and 144 corresponding to ground truths, bounding boxes 126, 136, and 146 determined using only feature information, and bounding boxes 125, 135, and 145 obtained by the object tracking apparatus using both feature information and color information, e.g., of the feature score maps 121, 131, and 141 and the color score maps 127, 137, and 147, respectively.

The search image 123 represents a general situation. The bounding box 126 is selected based on a region 122 representing a highest probability in the feature score map 121. The bounding box 125 is selected based on the region 122 and a region 128 representing a highest probability in the color score map 127. For example, in this case, it can be seen in FIG. 1 that bounding box 125 and the bounding box 126 almost match the bounding box 124 corresponding to the ground truth.

The search image 133 represents a situation in which an unlearned target (corresponding to the bounding box 136) similar to an object is present. The bounding box 136 is selected based on a region 132 representing a highest probability in the feature score map 131. The bounding box 135 is selected based on the region 132 and a region 138 representing a highest probability in the color score map 137. For example, in this case, it can be seen in FIG. 1 that the bounding box 135 almost matches the bounding box 134 corresponding to the ground truth, while the bounding box 136 of the incorrect unlearned target would give an incorrect result.

The search image 143 represents a situation in which a target (corresponding to the bounding box 146) having similar feature information to an object is present. The bounding box 146 is selected based on a region 142 representing a highest probability in the feature score map 141. The bounding box 145 is selected based on the region 142 and a region 148 representing a highest probability in the color score map 147. For example, in this case, it can be seen in FIG. 1 that bounding box 145 almost matches the bounding box 144 corresponding to the ground truth, while the bounding box 146 would give an incorrect result.

As such, the object tracking apparatus may use both feature information and color information comprehensively, thereby achieving higher accuracy compared to a case of using only feature information.

Figure 2:
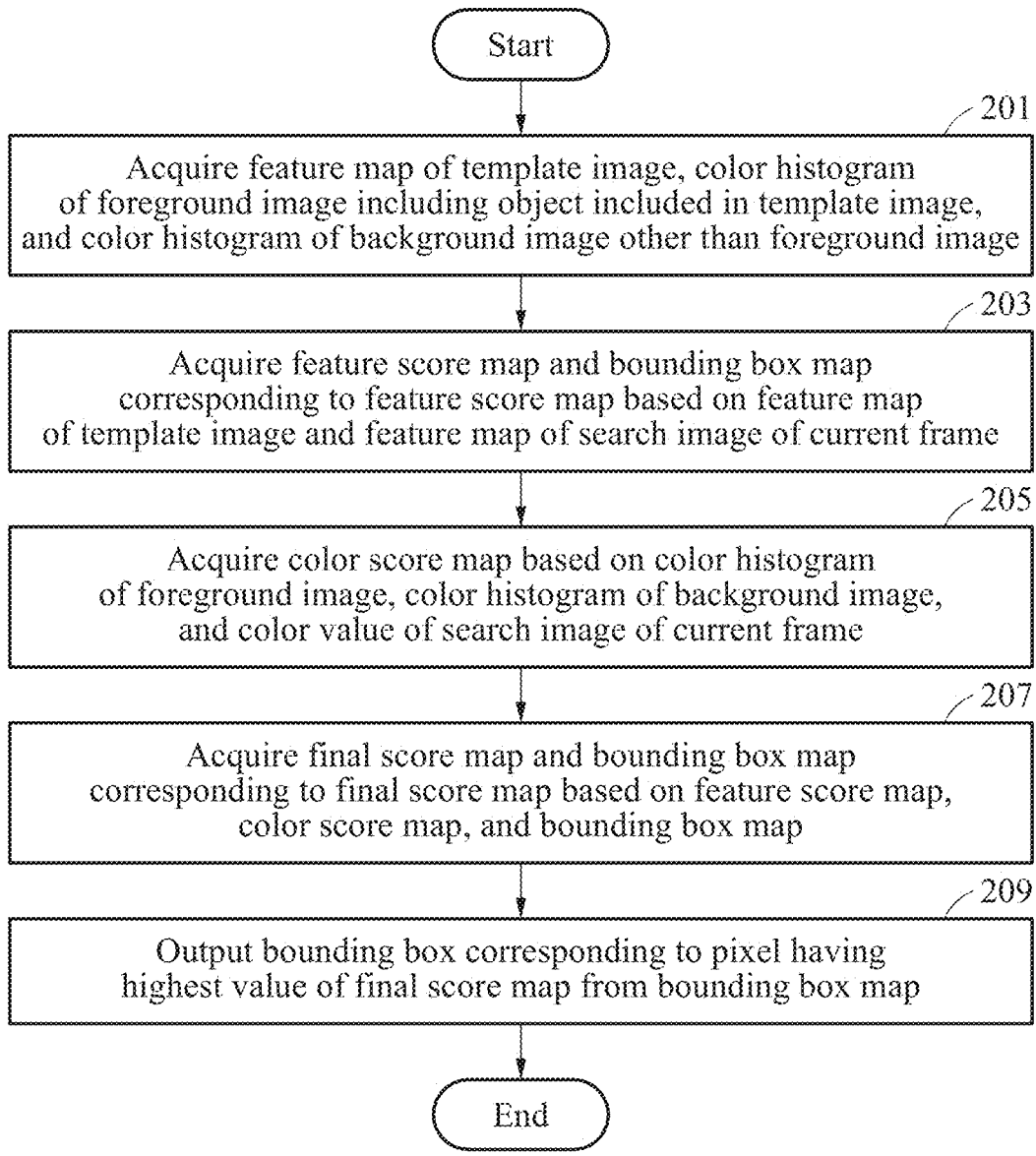
FIG. 2 is a flowchart illustrating example operations of an object tracking method.

FIG. 2 is a flowchart illustrating example operations of an object tracking method.

In operation 201, an object tracking apparatus may acquire a feature map of a template image, a color histogram of a foreground image including an object included in the template image, and a color histogram of a background image other than the foreground image.

In operation 203, the object tracking apparatus may acquire a feature score map and a bounding box map corresponding to the feature score map based on the feature map of the template image and a feature map of a search image of a current frame.

In operation 205, the object tracking apparatus may acquire a color score map based on the color histogram of the foreground image, the color histogram of the background image, and a color value of the search image of the current frame.

In operation 207, the object tracking apparatus may acquire a final score map and a bounding box map corresponding to the final score map based on the feature score map, the color score map, and the bounding box map.

In operation 209, the object tracking apparatus may output a bounding box corresponding to a pixel, for example, having a highest value of the final score map from the bounding box map.

Figure 3:
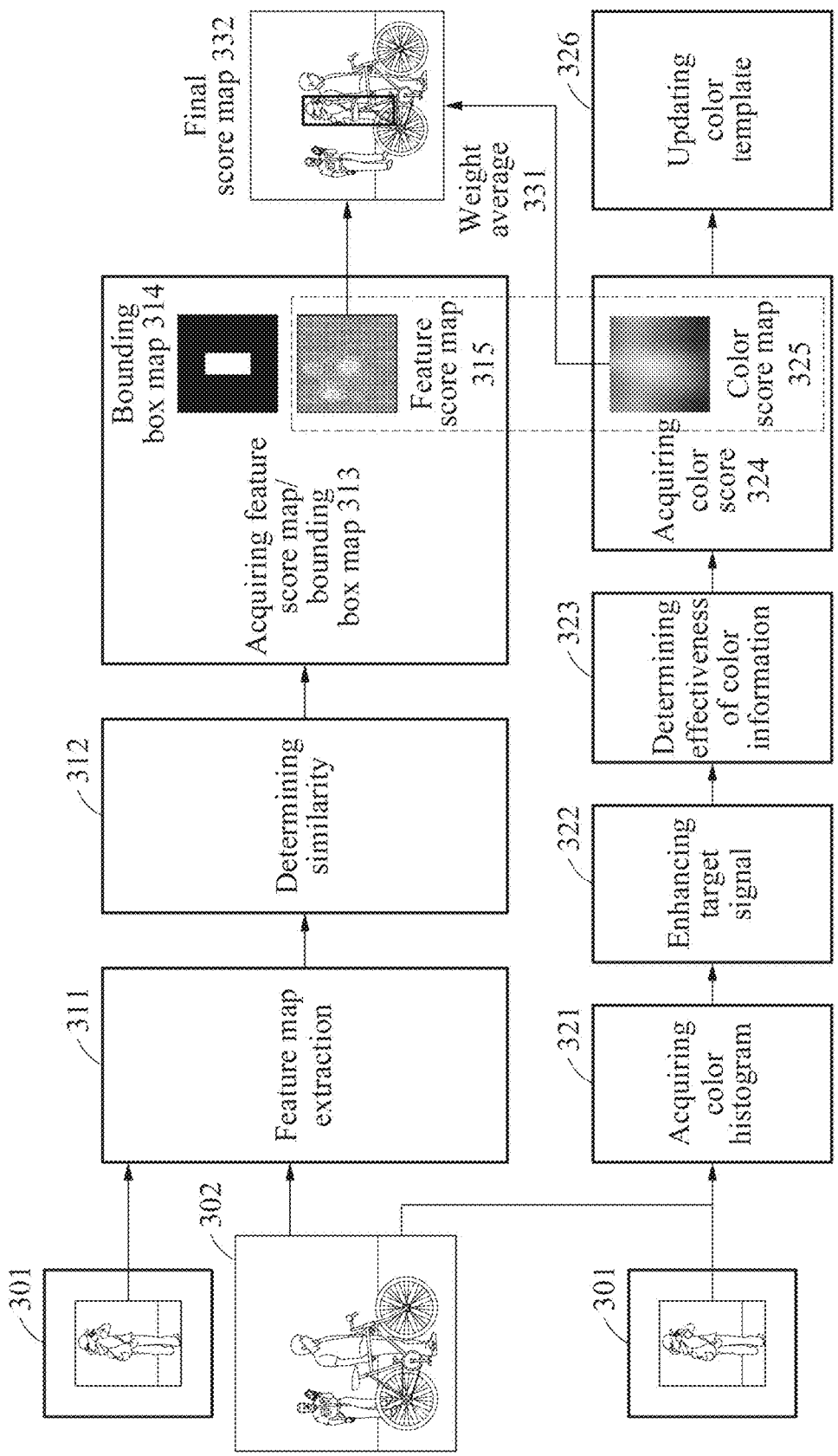
FIG. 3 is a flowchart illustrating an example object tracking method.

FIG. 3 is a flowchart illustrating an example object tracking method.

A template image 301 is provided. The template image 301 may include a small margin space around an object. The template image 301 may be used to extract feature information of the object.

The illustrated upper pipeline demonstrates a process of generating feature information. In operation 311, an object tracking apparatus may perform feature map extractions on each of the template image 301 and a provided search image 302. The search image 302 may be input in a form of continuous frames, for example. In operation 312, the object tracking apparatus may determine a similarity between a feature map of the template image 301 and a feature map of the search image 302. For example, the object tracking apparatus may calculate a correlation between the feature map of the template image 301 and the feature map of the search image 302. In operation 313, the object tracking apparatus may acquire a feature score map 315 representing a similarity result of the calculated correlation or determined similarity. The object tracking apparatus may acquire a bounding box map 314 including bounding box information corresponding to each pixel of the feature score map 315.

The illustrated lower pipeline demonstrates a process of generating color information. In operation 321, the object tracking apparatus may acquire or generate a color histogram (or color template) from the template image 301. The object tracking apparatus may generate a color histogram for each of a determined foreground image and a determined background image making up the template image 301.

In operation 322, the object tracking apparatus may enhance a target signal in the color histogram. The object tracking apparatus may adjust intensities of signals of the color histogram of the foreground image and the color histogram of the background image. The object tracking apparatus may adjust the intensity of the signal of each of the color histograms based on an area ratio between the foreground and the background, such as discussed above with respect to Equation 1, as a non-limiting example.

In operation 323, the object tracking apparatus may determine an effectiveness of color information. As a difference in color distribution between the foreground image and the background image increases, the effectiveness of the color information may be evaluated to be a higher value. The object tracking apparatus may generate a foreground color similarity map of a color value of the search image and the color histogram of the foreground image. The object tracking apparatus may generate a background color similarity map of the color value of the search image and the color histogram of the background image. The object tracking apparatus may calculate a feature weight representing a similarity between the foreground color similarity map and the background color similarity map. The object tracking apparatus may also calculate a color weight representing a non-similarity between the foreground color similarity map and the background color similarity map.

Here, the color weight may be used as an index representing the effectiveness. The color weight may be compared to a second threshold, e.g., experimentally determined in advance. When the color weight is equal to or greater than, or meets, the second threshold, it is determined that the color information is effective. In an opposite case, when the color weight is less than or fails to meet the second threshold, it may be determined that the color information is ineffective.

When the color information is determined effective, in operation 324 the object tracking apparatus may acquire a color score map 325. The object tracking apparatus may acquire the color score map 325 by calculating a ratio of the foreground color similarity map to a sum of the foreground color similarity map and the background color similarity map for each pixel, such as demonstrated above with respect to Equation 2, as a non-limiting example.

When the color information has been determined effective, the object tracking apparatus may generate a final score map 332 based on the feature score map 315 and the color score map 325. For example, the object tracking apparatus may generate a final score map 332 by calculating a weight average 331 by applying the feature weight and the color weight to the feature score map 315 and the color score map 325, respectively, such as demonstrated above with respect to Equation 4, as a non-limiting example. The object tracking apparatus may output a bounding box corresponding to a pixel having a highest probability in the final score map 332.

When the color information has been determined effective, in operation 326, the object tracking apparatus may update the color template. The object tracking apparatus may distinguish between a foreground image and a background image based on the bounding box acquired from the current search image, and generate the color histogram of the foreground image and the color histogram of the background image. Here, object information changed by adding information on the color template acquired from the current search image to a color template of up to a previous frame may be included. The updated color template may then be used when tracking the object in the search image of a subsequent frame.

When the color information is determined ineffective, the object tracking apparatus may generate the final score map 332 based on the feature information, without consideration of the color information. For example, the object tracking apparatus may use the feature score map 315 as the final score map 332. Also, the object tracking apparatus may omit the color template update using the color information of the current frame when the color information is determined ineffective.

In addition, the object tracking apparatus may determine an objectness of the feature score map 315. The object tracking apparatus may compare the highest probability value of the feature score map 315 and a first threshold. When the highest probability value of the feature score map 315 is less than the first threshold, or fails to meet the first threshold, the object tracking apparatus may determine that an objectness of the current frame is small. This may imply that the object is absent in the current frame for reasons such as occlusion. The object tracking apparatus may omit tracking by information of the current frame, and output the bounding box of the previous frame or may not output a bounding box for the current frame. Rather, when the highest probability value of the feature score map 315 is equal to or greater than the first threshold or meets the first threshold, the object tracking apparatus may determine that an objectness of the current frame is satisfactory and will continue the processes to generate and output the bounding box of the current frame.

Figure 4:
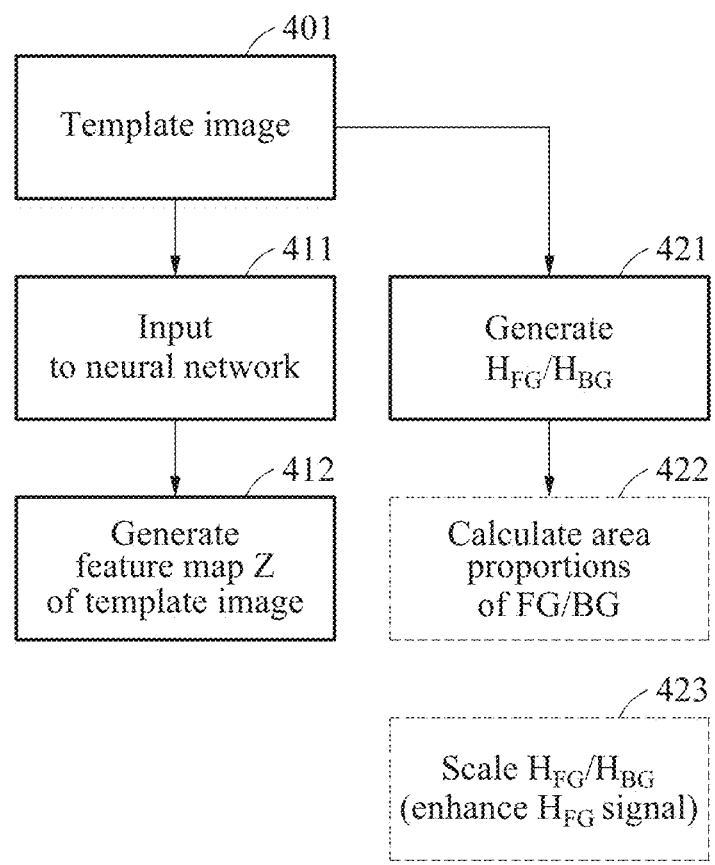
FIG. 4 is a flowchart illustrating an example initialization process of an object tracking method.

FIG. 4 is a flowchart illustrating an example initialization process of an object tracking method.

An object tracking apparatus may receive a template image 401 as a first input. The template image 401 may refer to a representative image of an object and may be composed of a foreground image including an object and a background image other than the foreground image. The template image 401 may be input once when an object tracking process starts. After that, template information may be updated based on information of a search image.

In operation 411, the template image 401 may be input to a neural network. The neural network may be trained to extract feature information from an arbitrary image. The neural network may output a feature value for each pixel of the template image 401. In operation 412, the neural network may output a feature map Z including feature values of all pixels of the template image 401.

In operation 421, the object tracking apparatus may generate a color histogram $H_{FG}$ of the foreground image and a color histogram $H_{BG}$ of the background image. The feature map Z, the color histogram $H_{FG}$, and the color histogram $H_{BG}$ for the template image 401 may be stored as the template information.

In operation 422, the area proportion of the background image may be calculated, and an area proportion of the foreground image may be calculated. For example, the above discussion regarding Equation 1 in the discussion of FIG. 1 demonstrates an example calculation of the area proportions, as a non-limiting example.

In an example, in operation 423, the color histogram $H_{FG}$ and the color histogram $H_{BG}$ may be scaled to enhance the $H_{FG}$ signal, such as also discussed above with respect to the discussion regarding Equation 1, as non-limiting example, discussing the scaling of the foreground/background color similarity maps based on the Equation 1 calculated $\alpha_t$, such as with the $H_{FG}$ signal being scaled by $\alpha_t$, and the color histogram $H_{BG}$ being scaled by $1-\alpha_t$. The scaled color histogram $H_{FG}$ and the scaled color histogram $H_{BG}$ may be stored in the template information.

Figure 5:
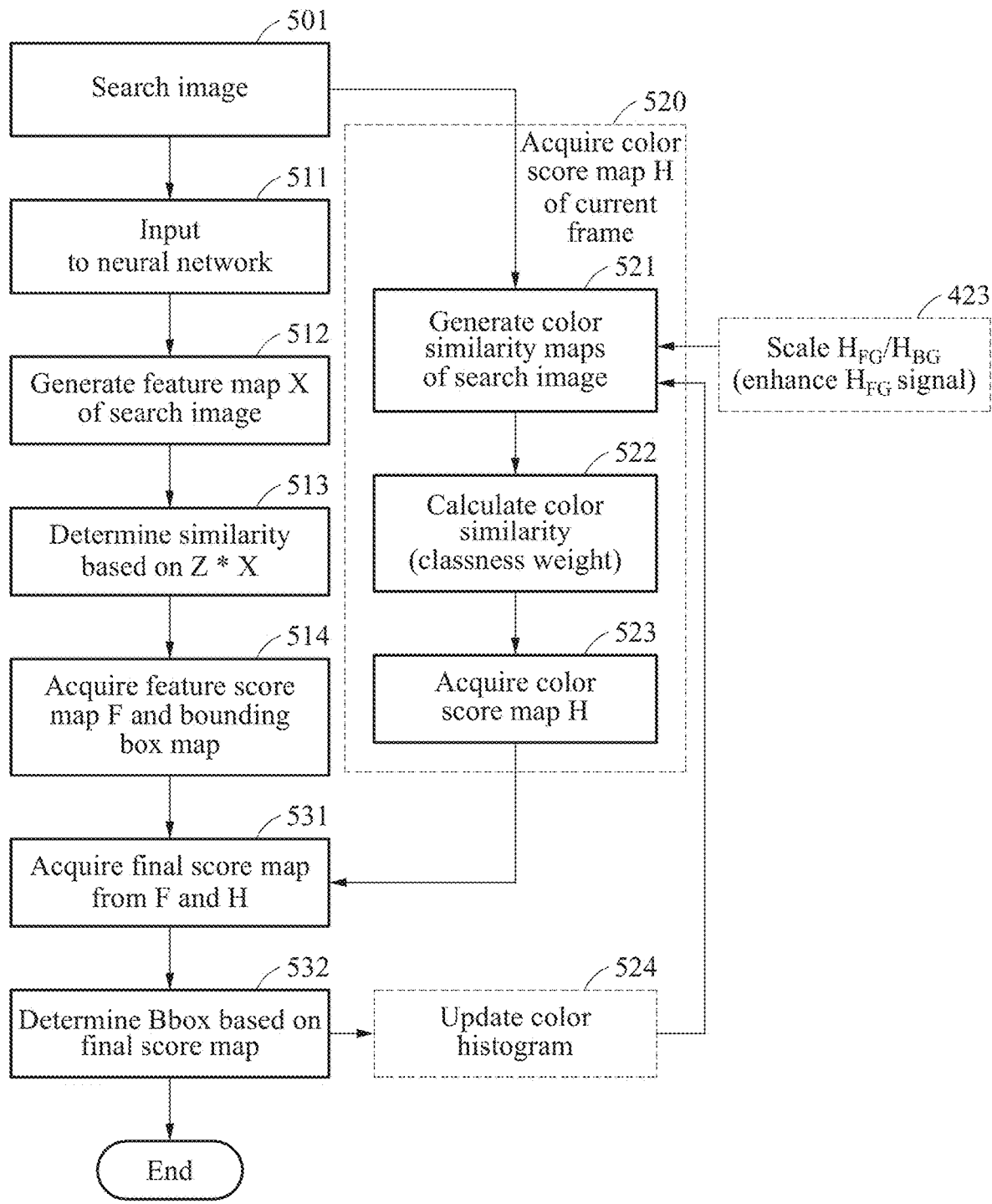
FIG. 5 is a flowchart illustrating an example process following an initialization in an object tracking method.

FIG. 5 is a flowchart illustrating an example process following an initialization in an object tracking method.

After the initialization process of FIG. 4 is completed, a sequence of a search image 501 from which an object is to be searched for may be input. In operation 511, the search image 501 of a current frame may be input to a neural network. The neural network may be trained to extract feature information from an arbitrary image. As a non-limiting example, the neural network used to extract feature information from the search image 501 may be the same neural network used in FIG. 4 to generate the feature map Z for the template image 401.

In operation 512, the neural network may output a feature value of each pixel of the search image 501. The neural network may generate a feature map X including feature values of all pixels of the search image 501.

In operation 513, an object tracking apparatus may determine a similarity between the feature map Z of the template image 401 and the feature map X of the search image 501 stored as the template information. For example, the object tracking apparatus may determine the similarity through an operation of Z*X, e.g., a cross correlation between Z and X, as a non-limiting example.

In operation 514, the object tracking apparatus may acquire a feature score map F representing the similarity of the feature map Z and the feature map X. The object tracking apparatus may acquire a bounding box map corresponding to each pixel of the feature score map F. Each pixel value of the feature score map F represents a similarity between a feature value of the template image 401 and a feature value of the search image 501, which may refer to a probability of being an object that is being desired to be tracked. The bounding box map may include rectangular bounding box information indicating an area of an object when a predetermined pixel of the feature score map is a center of the object, noting again that the shape or form of the area of the object is not limited to rectangular bounding box shape and may be various other shapes or forms.

In operation 520, which may be performed in parallel with the processes for the acquiring of the feature score map F and the bounding box map resulting from operation 514, the object tracking apparatus may acquire a color score map H of a current frame.

For example, in operation 521, the object tracking apparatus may generate a color similarity map of the search image.

For example, object tracking apparatus may fetch a histogram of the scaled template image, as generated in operation 423. For this, the object tracking apparatus may acquire a foreground color similarity map representing a similarity probability for each pixel of a color value of the search image 501 dependent or based on the scaled color histogram $H_{FA}$ of the foreground image FG. The object tracking apparatus may acquire a background color similarity map representing a similarity probability for each pixel of the color value of the search image 501 dependent or based on the scaled color histogram $H_{BG}$ of the background image BG.

In operation 522, the object tracking apparatus may calculate a feature weight representing a color similarity of the foreground image FG and the background image BG, as well as the effectiveness of the color information in use to calculate the final score map. The object tracking apparatus may obtain the feature weight by calculating an inner product between the foreground color similarity map and the background color similarity map. The object tracking apparatus may calculate a color weight representing a color non-similarity of the foreground image FG and the background image BG. For example, the color weight and feature weights may be calculated as discussed above with respect to Equation 3, as a non-limiting example.

In operation 523, the object tracking apparatus may acquire the color score map H from the foreground color similarity map and the background color similarity map. The object tracking apparatus may acquire the color score map H by calculating a ratio of a pixel value of the foreground color similarity map to a sum of the pixel value of the foreground color similarity map, a pixel value of the background color similarity map, and an adjustment constant for each pixel. For example, the color score map H may be calculated as discussed above with respect to Equation 2, as a non-limiting example.

In operation 531, the object tracking apparatus may acquire a final score map from the feature score map F and the color score map H. The object tracking apparatus may acquire the final score map by calculating a weight average by applying the feature weight to the pixel value of the feature score map F and applying the color weight to the pixel value of the color score map H for each pixel. For example, a final score map may be calculated as discussed above with respect to Equation 4, as a non-limiting example.

In operation 532, the object tracking apparatus may determine a bounding box Bbox based on the final score map. The object tracking apparatus may output a bounding box in which a center is a pixel having a highest probability value of the final score map, as an area of the object of the current frame, as a non-limiting example.

In operation 524, the object tracking apparatus may update the color histogram $H_{FG}$ of the foreground image FG and the color histogram $H_{BG}$ of the background image BG. For example, the object tracking apparatus may set an inside of the output bounding box to be the foreground image and set a predetermined area of a patch surrounding the bounding box to be the background image while excluding the bounding box. The object tracking apparatus may newly acquire or generate the color histogram $H_{FG}$ of the newly set foreground image and the histogram $H_{BG}$ of the newly set background image, and apply a predetermined weight, thereby updating the color histograms of the existing template information.

Figure 6:
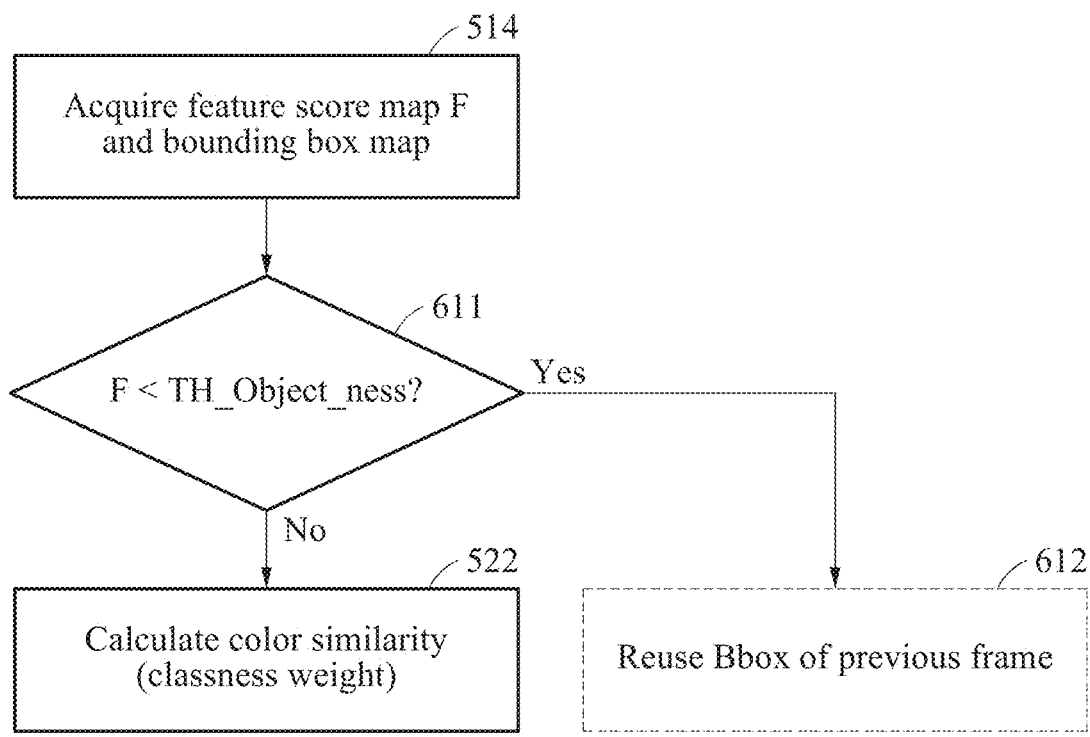
FIG. 6 is a flowchart illustrating an example of an operation of determining whether to use information of a current frame in an object tracking method.

FIG. 6 is a flowchart illustrating an example of an operation of determining whether to use information of a current frame in an object tracking method.

In operation 514, an object tracking apparatus may acquire a feature score map F representing a similarity of a feature map Z and a feature map X. The object tracking apparatus may acquire a bounding box map corresponding to each pixel of the feature score map F.

For example, in operation 611, the object tracking apparatus may determine an objectness of the feature score map F. A first threshold TH_Objectness may be a criterion for determining an objectness. For example, the object tracking apparatus may compare a largest pixel value of the feature score map F to TH_Objectness.

When the largest pixel value of the feature score map F is less than TH_Objectness, or fails to meet TH_Objectness, in operation 612, the object tracking apparatus may reuse a bounding box Bbox of a previous frame and not determine the bounding box Bbox for the current frame.

When the largest pixel value of the feature score map F is equal to or greater than TH_Objectness, or meets TH_Objectness, in operation 522, the object tracking apparatus may calculate a feature weight representing a color similarity of the foreground image FG and the background image BG, and that feature weight may be used in the calculating of the final score map of the current frame, and from which the bounding box Bbox for the current frame may be determined.

Figure 7:
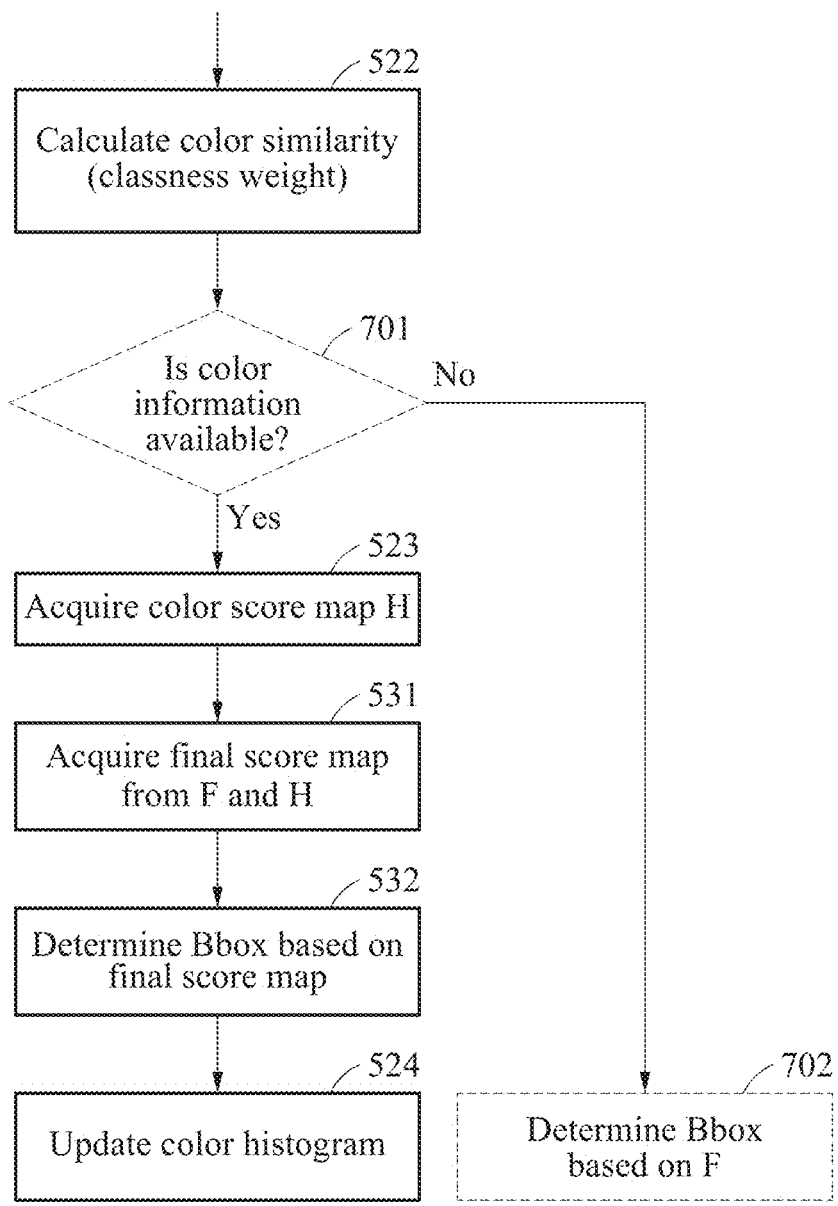
FIG. 7 is a flowchart illustrating an example of an operation of determining whether to use color information in an object tracking method.

FIG. 7 is a flowchart illustrating an example of an operation of determining whether to use color information in an object tracking method.

In operation 522, the object tracking apparatus may calculate a feature weight representing a color similarity of a foreground image FG and a background image BG. The object tracking apparatus may calculate a color weight representing a color non-similarity of the foreground image FG and the background image BG.

For example, in operation 701, the object tracking apparatus may determine an availability of color information. An effectiveness of the color information may be expressed as a color weight. The object tracking apparatus may compare the color weight and a second threshold.

When the color weight is less than, or fails to meet, the second threshold, in operation 702, the object tracking apparatus may determine a bounding box Bbox based on a feature score map F, without consideration of the color information. For example, the object tracking apparatus may use the feature score map F as a final score map.

When the color weight is equal to or greater than the second threshold, or the color weight meets the second threshold, in operation 523, the object tracking apparatus may acquire color score map H from the foreground color similarity map and the background color similarity map, such as discussed above with respect to Equation 2, as a non-limiting example. In operation 531, the object tracking apparatus may acquire a final score map from the feature score map F and the color score map H, such as discussed above with respect to Equation 4, as a non-limiting example. In operation 532, the object tracking apparatus may determine the bounding box Bbox based on the final score map. In operation 524, the object tracking apparatus may update the color histogram of the foreground image FG and the color histogram of the background image BG.

Figure 8:
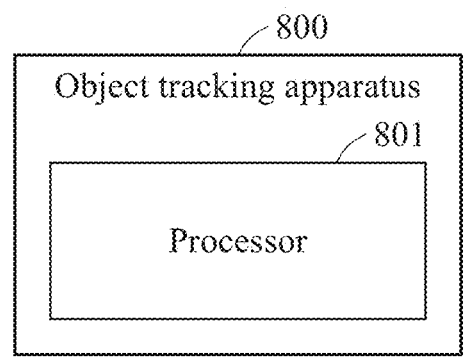
FIG. 8 illustrates an example object tracking apparatus.

FIG. 8 illustrates an example object tracking apparatus.

An object tracking apparatus 800 includes at least one processor 801. The processor 801 may acquire a feature map of a template image, a color histogram of a foreground image including an object included in the template image, and a color histogram of a background image other than the foreground image.

The processor 801 may acquire a feature score map and a bounding box map corresponding to the feature score map based on the feature map of the template image and a feature map of a search image of a current frame.

The processor 801 may acquire a color score map based on the color histogram of the foreground image, the color histogram of the background image, and a color value of the search image of the current frame. The processor 801 may acquire a final score map and a bounding box map corresponding to the final score map based on the feature score map, the color score map, and the bounding box map. The processor 801 may output a bounding box corresponding to a pixel having a highest value of the final score map from the bounding box map.

Figure 9:
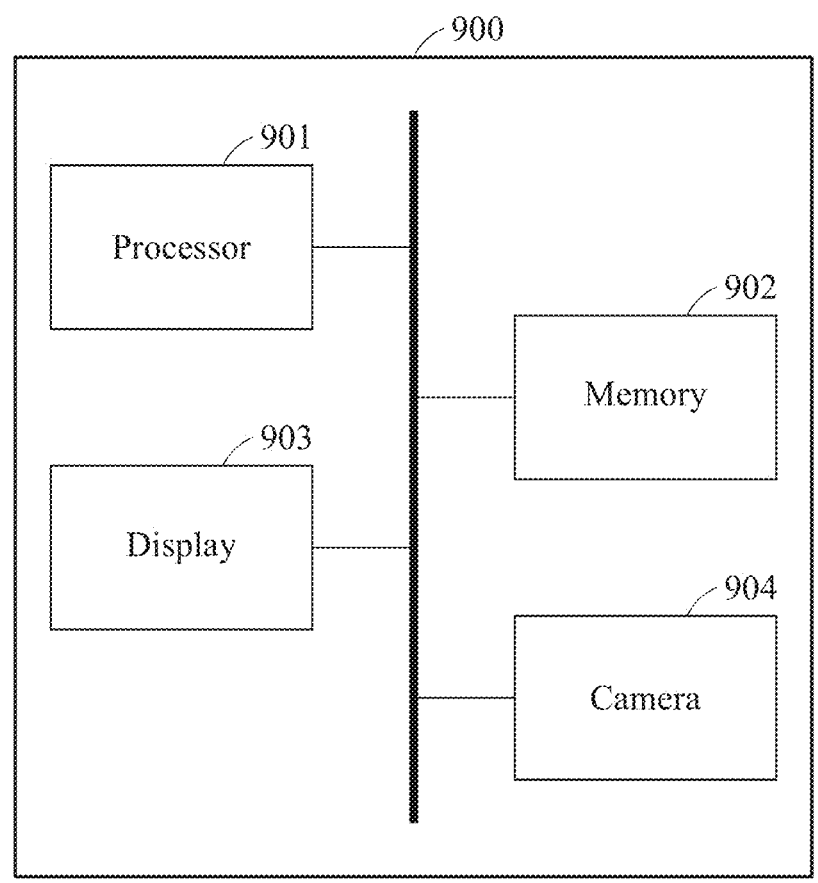
FIG. 9 illustrates an example terminal or system with object tracking.

FIG. 9 illustrates an example terminal or system with object tracking.

A terminal or system 900 includes one or more of each of a processor 901, a memory 902, a display 903, and camera 904.

At least one of the processors 901 may acquire a feature map of a template image, a color histogram of a foreground image including an object included in the template image, and a color histogram of a background image other than the foreground image. For example, in an example the terminal or system 900 is a mobile phone, other computing apparatus, or surveillance system with or connected to the one or more cameras 904. In an example, at least one of the processors 901 may control the one or more cameras 904 to capture image frames, e.g., sequential image frames, image information of the template image, image information of the foreground image, and image information of the background image, as non-limiting examples. At least one camera 904 is a color sensing camera.

The processor 901 may acquire a feature score map and a bounding box map corresponding to the feature score map based on the feature map of the template image and a feature map of a search image of a current frame.

The processor 901 may acquire a color score map based on the color histogram of the foreground image, the color histogram of the background image, and a color value of the search image of the current frame. The processor 901 may acquire a final score map and a bounding box map corresponding to the final score map based on the feature score map, the color score map, and the bounding box map. The processor 901 may output, through operation of the display 903, a bounding box corresponding to a pixel having a highest value of the final score map from the bounding box map. In an example, the processor 901 includes or is the processor 801 of the object tracking apparatus 800 of FIG. 8, and the object tracking apparatus 800 is also representative of the example mobile phone, other computing apparatus, or surveillance system.

At least one of the memory 902 may store instructions, which when executed by the processor 901, configure the processor 901 to implement or perform one or more, any combination, or all operations or methods described herein. At least one of the memory 902 may store the acquired feature map of the template image, the color histogram of the foreground image including the object included in the template image, the color histogram of the background image other than the foreground image, the feature score map and the bounding box map, the feature map of the search image of the current frame, the color score map, the color value of the search image of the current frame, the final score map, and the bounding box map, e.g., temporarily store any or any combination of the same. At least one of the memory 902 may store any one, any combination, or all neural networks described herein, e.g., the trained parameters and any other parameters of the respective neural network(s), and at least one of the processor 901 may be configured, e.g., through implementation of such respective neural network(s), to implement the aforementioned trained operations of the corresponding respective neural network(s), as described above.

The object tracking apparatuses, computing devices, mobile devices or terminals, surveillance systems, processors, memories, displays, and cameras, as well as the remaining apparatuses, devices, and other components described herein with respect to FIGS. 1-9, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, as well as one or more systolic arrays in combination therewith as a non-limiting example, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, as well as one or more systolic arrays in combination therewith, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:
    acquiring a feature map of a template image, a color histogram of a foreground of the template image, and a color histogram of a background of the template image other than the foreground, where the foreground includes an object included in the template image;
    acquiring a feature score map, and a bounding box map corresponding to the feature score map, based on the feature map of the template image and a feature map of a search image of a current frame;
    acquiring a color score map based on the color histogram of the foreground, the color histogram of the background, and a color value of the search image of the current frame;
    acquiring a final score map, and a bounding box map corresponding to the final score map, based on the feature score map, the color score map, and the bounding box map; and
    outputting a bounding box corresponding to a pixel having a highest value of the final score map from the bounding box map.

2. The method of claim 1, wherein the acquiring of the color score map comprises:
    acquiring a foreground color similarity map based on the color value of the search image and the color histogram of the foreground;
    acquiring a background color similarity map based on the color value of the search image and the color histogram of the background; and
    acquiring the color score map based on the foreground color similarity map and the background color similarity map.

3. The method of claim 2, wherein the acquiring of the color score map based on the foreground color similarity map and the background color similarity map comprises acquiring the color score map by calculating a ratio of a pixel value of the foreground color similarity map to a sum of the pixel value of the foreground color similarity map and a pixel value of the background color similarity map, for each pixel.

4. The method of claim 2,
    wherein the acquiring of the color score map further comprises scaling the foreground color similarity map and the background color similarity map based on an area proportion of the background and an area proportion of the foreground, respectively, and
    the acquiring of the color score map based on the foreground color similarity map and the background color similarity map comprises acquiring the color score map based on the scaled foreground color similarity map and the scaled background color similarity map.

5. The method of claim 4, wherein the acquiring of the color score map based on the scaled foreground color similarity map and the scaled background color similarity map comprises acquiring the color score map by calculating a ratio of a pixel value of the scaled foreground color similarity map to a sum of the pixel value of the scaled foreground color similarity map, a pixel value of the scaled background color similarity map, and an adjustment constant, for each pixel.

6. The method of claim 1, further comprising:
acquiring a foreground color similarity map based on the color value of the search image and the color histogram of the foreground;
acquiring a background color similarity map based on the color value of the search image and the color histogram of the background; and
calculating a color weight representing an extent of non-similarity of the foreground color similarity map and the background color similarity map.

7. The method of claim 6, wherein the calculating of the color weight comprises:
calculating a feature weight representing a similarity between the foreground color similarity map and the background color similarity map; and
calculating the color weight by subtracting the feature weight from a reference constant.

8. The method of claim 7, wherein the calculating of the color weight comprises calculating the color weight through an inner product between the foreground color similarity map and the background color similarity map.

9. The method of claim 7, wherein the acquiring of the final score map, and the bounding box map corresponding to the final score map, comprises acquiring the final score map by calculating a weight average by applying the feature weight to a pixel value of the feature score map and applying the color weight to a pixel value of the color score map, for each pixel.

10. The method of claim 9, wherein the acquiring of the final score map, and the bounding box map corresponding to the final score map, further comprises adjusting resolutions of the feature score map and the color score map equally to acquire the final score map and the bounding box map corresponding to the final score map.

11. The method of claim 6, further comprising:
comparing the color weight to a second threshold,
wherein in response to the color weight failing to meet the second threshold, the acquiring of the bounding box map comprises using the feature score map and the bounding box map as the final score map and the bounding box map corresponding to the final score map.

12. The method of claim 1, further comprising:
comparing a maximum value of a pixel of the feature score map to a first threshold,
wherein in response to the maximum value of the pixel of the feature score map failing to meet the first threshold, the acquiring of the color score map and the acquiring of the bounding box map are selected to not be performed, and the outputting of the bounding box comprises outputting a bounding box of a previous frame.

13. The method of claim 1, further comprising:
updating the color histogram of the foreground and the color histogram of the background based on the bounding box corresponding to the pixel having the highest value.

14. The method of claim 13, further comprising:
acquiring a foreground color similarity map based on the color value of the search image and the color histogram of the foreground;
acquiring a background color similarity map based on the color value of the search image and the color histogram of the background;
calculating a color weight representing an extent of non-similarity of the foreground color similarity map and the background color similarity map; and
comparing the color weight to a second threshold,
wherein, in response to the color weight failing to meet the second threshold, the updating is selected to not be performed.

15. The method of claim 1, wherein the outputting of the bounding box includes tracking the object in the search image using the bounding box corresponding to the pixel.

16. The method of claim 15, wherein the tracking of the object includes displaying the object on a display.

17. The method of claim 1, wherein the acquiring of the feature map of the template image includes applying the template image to a neural network feature extractor to obtain the feature map of the template image, and the feature map of the search image is generated by applying the search image to the neural network feature extractor to obtain the feature map of the search image.

18. A non-transitory computer-readable storage medium storing instructions that, when executed by a processor, configure the processor to perform the method of claim 1.

19. A processor-implemented method, the method comprising:
generating a feature map of a search image;
generating a feature score map based on the generated feature map of the search image, and an obtained feature map for a template that includes a target object;
generating a color score map dependent on a distribution of color information in a first portion of the template, a distribution of color information in a second portion of the template distinguished from the first portion, and color information of the search image, where the first portion includes the target object; and
tracking the target object in the search image using a bounding box determined based on the generated feature score map and the generated color score map.

20. The method of claim 19, wherein the obtained feature map for the template is read from a memory, the feature map for the template having been generated and stored to the memory with respect to a previous tracking of the target object for a previous search image.

21. The method of claim 19, wherein the second portion of the template is distinguished from the first portion of the template based on a bounding box determined for a previous tracking of the target object for a previous search image.

22. The method of claim 21,
wherein the distribution of the color information in the first portion of the template is a scaled first histogram of the first portion of the template, and the distribution of the color information in the second portion of the template is a scaled second histogram of the second portion of the template, and
wherein the generating the color score map includes obtaining the scaled first histogram and the scaled second histogram from a memory, the scaled first histogram and the scaled second histogram having been generated and stored to the memory with respect to the previous tracking of the target object for the previous search image.

23. The method of claim 19, wherein generating of the color score map comprises:
acquiring a first color similarity map dependent on the search image and a color histogram of a foreground of the template, as the distribution of the color information in the first portion of the template;
acquiring a second color similarity map dependent on the search image and a color histogram of a background of the template, as the distribution of the color information in the second portion of the template; and acquiring the color score map based on the first color similarity map and the second color similarity map.

24. The method of claim 23, wherein the acquiring of the color score map based on the first color similarity map and the second color similarity map comprises acquiring the color score map by calculating a ratio of a pixel value of a foreground color similarity map, as the first color similarity map, to a sum of the pixel value of the foreground color similarity map and a pixel value of a background color similarity map, as the second color similarity map.

25. The method of claim 24, wherein the acquiring of the color score map based on the foreground color similarity map and the background color similarity map includes:
   scaling the foreground color similarity map and the background color similarity map respectively, based on an area proportion of the background of the template and an area proportion of the foreground of the template; and
   acquiring the color score map based on the scaled foreground color similarity map and the scaled background color similarity map.

26. An apparatus, the apparatus comprising:
   one or more processors configured to:
      generate a first feature map of a first search image;
      generate a first feature score map dependent on the first feature map of the first search image and an obtained first feature map for a template that includes a target object;
      generate a first color score map dependent on color information of the first search image, color information in a first portion of the template, and color information in a second portion of the template distinguished from the first portion, where the first portion includes the target object;
      update the template by updating extents of the first portion and the second portion of the template based on a bounding box determined for the target object in the first search image, where the bounding box is determined dependent on the first feature score map and the first color score map; and
      track the target object in a second search image, subsequent to the first search image, dependent on the updated template.

27. The apparatus of claim 26, wherein the tracking of the target object in the second search image includes tracking the target object in the second search image dependent on feature information of the second search image, feature information of the updated template, color information of the second search image, and color information of the updated template.

28. The apparatus of claim 26, wherein, in the updating of the template, the one or more processors are further configured to generate a color histogram of a foreground of the updated template and a color histogram of a background based on the bounding box, wherein the foreground is defined by the updated extents of the first portion, and the background is defined by the updated extents of the second portion, and
   wherein the tracking of the target in the second search image is dependent on the generated color histogram of the foreground, the generated color histogram of the background, and feature and color information of the second search image.

29. An apparatus, the apparatus comprising:
   one or more processors configured to:
      acquire a feature map of a template image, a color histogram of a foreground of the template image, and a color histogram of a background of the template image other than the foreground, where the foreground includes an object included in the template image;
      acquire a feature score map, and a bounding box map corresponding to the feature score map, based on the feature map of the template image and a feature map of a search image of a current frame;
      acquire a color score map based on the color histogram of the foreground, the color histogram of the background, and a color value of the search image of the current frame;
      acquire a final score map, and a bounding box map corresponding to the final score map, based on the feature score map, the color score map, and the bounding box map; and
      output a bounding box corresponding to a pixel having a highest value of the final score map from the bounding box map.

30. A terminal comprising:
   a memory;
   a display; and
   one or more processors configured to:
      acquire a feature map of a template image, a color histogram of a foreground of the template image, and a color histogram of a background of the template image other than the foreground, where the foreground includes an object included in the template image;
      acquire a feature score map, and a bounding box map corresponding to the feature score map, based on the feature map of the template image and a feature map of a search image of a current frame;
      acquire a color score map based on the color histogram of the foreground, the color histogram of the background, and a color value of the search image of the current frame;
      acquire a final score map, and a bounding box map corresponding to the final score map, based on the feature score map, the color score map, and the bounding box map; and
      output, through the display, a bounding box corresponding to a pixel having a highest value of the final score map from the bounding box map.

* * * * *